United States Patent Office 3,125,563
Patented Mar. 17, 1964

3,125,563
AZO DYES CONTAINING A BENZO-
THIAZEPIN-ONE RING
Edmund B. Towne, William H. Moore, and Joseph B.
Dickey, Kingsport, Tenn., assignors to Eastman Kodak
Company, Rochester, N.Y., a corporation of New
Jersey
No Drawing. Filed July 19, 1962, Ser. No. 211,092
9 Claims. (Cl. 260—152)

This invention relates to monoazo dyes obtainable by coupling various diazo components with seven-membered heterocyclic coupling components variously called benzo-thia-aza-cycloheptadienes or compounds containing the benzothiazepin-one ring.

The coupling components have the following general formula:

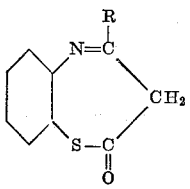

wherein R represents a lower alkyl group straight or branch-chained, or a monocyclic aryl group of the benzene series including phenyl, tolyl, chlorophenyl, chloronitrophenyl, nitrophenyl, dinitrophenyl, methoxyphenyl, nitromethoxyphenyl, cyanophenyl, etc. As described in the examples herein, these compounds can be prepared by alternative methods involving either the reaction of o-aminobenzthiol with diketene or acetoacetic esters.

Representative compounds are:

4-methyl-6,7-benzo-1-thia-5-aza-4,6-cycloheptadiene-2-one
4-phenyl-6,7-benzo-1-thia-5-aza-4,6-cycloheptadiene-2-one
4-(4-chlorophenyl)-6,7-benzo-1-thia-5-aza-4,6-cycloheptadiene-2-one
4-(4-nitrophenyl)-6,7-benzo-1-thia-5-aza-4,6-cycloheptadiene-2-one
4-ethyl-6,7-benzo-1-thia-5-aza-4,6-cycloheptadiene-2-one
4-(4-methoxyphenyl)-6,7-benzo-1-thia-5-aza-4,6-cycloheptadiene-2-one The azo dyes obtained by coupling these compounds with various known diazonium compounds have the following general formula:

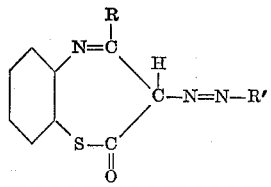

wherein

R=lower alkyl such as methyl, ethyl, propyl and butyl, or aryl as indicated above
R'=aryl as indicated above, thienyl or thiazolyl such as 5-nitrothiazoyl and 3-nitro-5-acylthienyl The dyes are particularly useful for dyeing polyester fibers such as poly(ethylene terephthalate) and poly(1,4-cyclohexyldimethylene terephthalate), producing light fast yellow to orange shades on these fibers. The dyes are applied to or developed on such fibers by methods well known in the art.

The following examples will serve to illustrate the preparation of the benzo-thia-aza-cycloheptadienes and typical azo dyes obtainable therefrom.

EXAMPLE 1

4-Methyl-6,7-Benzo-1-Thia-5-Aza-
4,6-Cycloheptadiene-2-One

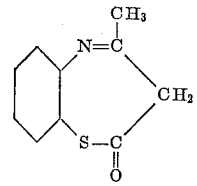

In a 1-liter, 3-necked flask, equipped with a dropping funnel, a mechanical stirrer, a reflux condenser, and a nitrogen inlet tube, was placed a solution of 25 grams (0.2 mole) of o-aminobenzenethiol in 400 ml. of benzene. The system was flushed with nitrogen and a nitrogen atmosphere maintained during the reaction. The solution was heated to reflux on a steam bath, and a solution of 16 grams (0.2 mole) of diketene in 50 ml. of benzene added dropwise during 30 minutes. After addition, the reaction mixture was stirred at reflux for one hour, the steam bath removed, and stirring continued while the flask was cooled to 10°. The precipitate thus obtained was filtered and recrystallized from ethanol (charcoal). Wt.=13.35 g., M.P. 112–14° (Sw. 110°), yield=35%.

EXAMPLE 2

4-Methyl-6,7-Benzo-1-Thia-5-Aza-4,6-Cycloheptadiene-
2-One (Alternate Procedure)

In a liter, 3-necked flask, equipped with a dropping funnel, a mechanical stirrer, a reflux condenser, and a nitrogen inlet tube, was placed a solution of 50 grams (0.4 mole) of o-aminobenzenethiol in 500 ml. of xylene. The system was flushed with nitrogen, and a nitrogen atmosphere maintained throughout the addition. Stirring was begun and the solution heated to reflux. A solution of 60 grams (0.46 mole) of ethyl acetoacetate in 50 ml. of xylene was added dropwise during 30 minutes, at reflux. The condenser was set for distillation and during the next 45 minutes, 400 ml. of xylene were distilled. The remaining solution was chilled in an ice bath. The solid which precipitated was filtered, dried and recrystallized from alcohol (charcoal). Wt.=12.25 grams, M.P. 113–16° (Sw. 108°). Concentration of the mother liquor gave a second crop. Wt.=9.75 grams, M.P. 112–15° (Sw. 108°), yield=28.8%.

EXAMPLE 3

4-Phenyl-6,7-Benzo-1-Thia-5-Aza-
4,6-Cycloheptadiene-2-One

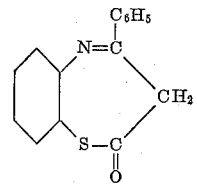

In a 500-ml., 3-necked flask was placed a solution of 26.5 grams (0.22 mole) of o-aminobenzenethiol in 250 ml. of xylene. The solution was stirred, and heated to reflux; then a solution of 45 grams (0.23 mole) of ethylbenzoylacetate in 40 ml. of xylene was added dropwise during 30 minutes, at reflux. After the addition was completed, the solution was stirred at reflux for an additional 15 minutes, then distilled 175 ml. of the xylene. The remaining solution was chilled in an ice bath. A yellow crystalline solid was filtered, dried and recrystallized from alcohol (charcoal). Wt.=10.26 g., M.P. 107–9°. Concentration of the mother liquor gave a second crop. Wt.=8.28 g., M.P. 107-9°, yield=33.3%.
*Analysis.*—Calcd.: C=71.15%; H=4.35%; N=5.53%; S=12.65%. Found: C=70.58%; H=4.58%; N=5.74%; S=12.32%.

EXAMPLE 4

Diazotization (A)

Nitrosylsulfuric acid was prepared by adding 7.6 g. (0.11 mole) of sodium nitrite portionwise to 50 ml. of concentrated sulfuric acid with stirring and allowing the temperature to rise to 65° C. The solution was then cooled to 5° C. and 100 ml. of a mixture of 15 ml. of propionic acid and 85 ml. of acetic acid was added dropwise with stirring, allowing the temperature to rise to 15° C. and keeping it there during the addition. The reaction mixture was then cooled to 0-5° C. and 17.25 g. (0.1 mole) of 4-chloro-2-nitroaniline was added portionwise while stirring, after which 100 ml. more of the propionic-acetic acid mixture was added, keeping the temperature at 0-5° C. The reaction mixture was then stirred at 0-5° C. for 2 hours and the excess sodium nitrite was destroyed by adding 1 g. of urea. The diazotization solution was filtered through a glass funnel and stored in a refrigerator for further use as needed.

Coupling (B)

To a solution of 0.76 g. (0.004 mole) of 4-methyl-6,7-benzo-1-thia-5-aza-4,6-cycloheptadiene-2-one in 10 ml. of the propionic-acetic acid mixture, cooled to 0° C., was added with stirring 10 ml. (0.004 mole) of the 4-chloro-2-nitrobenzenediazonium solution prepared as in (A) at such a rate that the temperature remained at 0-5° C. The coupling mixture was then neutralized to Congo red paper by the addition of anhydrous sodium acetate. After standing in a melting ice bath, with occasional manual stirring, for one hour, the mixture was drowned in 300 ml. of water with stirring. The dye was filtered, washed neutral and dried. The dye weighed 1.34 g. (89.5%). It dyes polyester fibers a deep, bright yellow with good affinity and excellent fastness to light.

The dye prepared as above has the formula

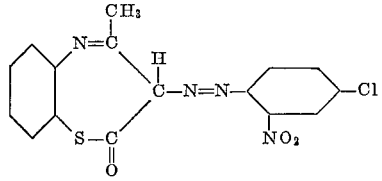

EXAMPLE 5

Diazotization (A)

In exactly the same manner and using quantities of reagents as in Example 4(A), 8.40 g. (0.05 mole) of 4-methoxy-2-nitroaniline was diazotized with nitrosylsulfuric acid in propionic-acetic acid solution.

Coupling (B)

A solution of 0.38 g. (0.002 mole) of 4-methyl-6,7-benzo-1-thia-5-aza-4,6-cycloheptadiene-4-one in 5 ml. of propionic-acetic acid mixture was coupled with 5 ml. (0.002 mole) of the 4-methoxy-2-nitrobenzenediazonium solution prepared as in (A), by the procedure set forth in Example 4(B). The dye weighed 0.68 g. (92%), and dyed polyester fibers a bright yellow shade with excellent fastness to light.

EXAMPLE 6

Diazotization (A)

18.3 grams (0.1 mole) of 2,4-dinitroaniline was diazotized with nitrosylsulfuric acid in propionic-acetic acid solution, using the same procedure and quantities of reagents as in Example 4(A).

Coupling (B)

Following the procedure in Example 4(B), 0.38 g. (0.002 mole) of 4-methyl-6,7-benzo-1-thia-5-aza-4,6-cycloheptadiene-2-one dissolved in 5 ml. of propionic-acetic acid mixture was coupled with 5 ml. (0.002 mole) of the 2,4-dinitrobenzenediazonium solution prepared as in (A). The dye weighed 0.65 g. (yield=84.5%) and dyed poly (1,4-cyclohexylenedimethylene terephthalate) fibers a deep yellow-orange shade with good light fastness. The dye dyed poly (ethylene terephthalate) fibers a bright yellow with excellent light fastness.

EXAMPLE 7

Diazotization (A)

To a solution of nitrosylsulfuric acid prepared by dissolving 0.76 g. (0.011 mole) of sodium nitrite in 5 ml. of concentrated sulfuric acid below 65° C., to which was added 10 ml. of the propionic-acetic acid mixture below 15° C., as described in Example 4(A), was added 2.14 g. (0.10 mole) of 5-amino-4-nitro-2-thienyl isopropyl ketone, below 5° C., followed by addition of 10 ml. more of propionic-acetic acid. After stirring for one hour at 0-5° C., the excess sodium nitrite was destroyed by addition of 0.1 g. min. and the clear diazonium solution was used immediately.

Coupling (B)

Following the procedure of Example 4(B), 0.95 g. (0.005 mole) of 4-methyl-6,7-benzo-1-thia-5-aza-4,6-cycloheptadiene-2-one dissolved in 12.5 ml. of propionic acid was coupled with 12.5 ml. (0.005 mole) of the diazonium solution from (A). The dye weighed 1.68 g. (yield is equal to 81%), and dyed polyester fibers a deep golden-brown shade with excellent-to-good light fastness.

The dye has the following formula:

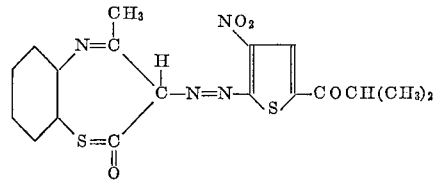

EXAMPLE 8

Following the procedure in Example 4(B), 0.51 g. (0.002 mole) of 4-phenyl-6,7-benzo-1-thia-5-aza-4,6-cycloheptadiene-2-one dissolved in 5 ml. of propionic-acetic acid mixture was coupled with 5 ml. (0.002 mole) of the 4-chloro-2-nitrobenzenediazonium solution from Example 4(A). The dye weighed 0.94 g. (yield=quant.). It dyed polyester fibers a deep, bright yellow shade, with excellent light fastness, but did not dye polyamide fibers.

The dye has the following formula:

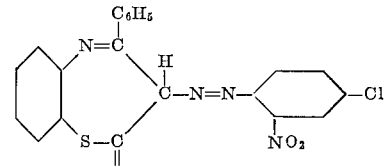

EXAMPLE 9

Diazotization (A)

1.38 grams (0.01 mole) of p-nitroaniline was dissolved in a mixture of 1.1 ml. of concentrated sulfuric acid and 2.5 ml. of water; ice (approximately 20 g.) was added, and a solution of 0.76 g. (0.011 mole) of sodium nitrite in 2 ml. of water was added all at once. The mixture was stirred normally until solution was effected; then the excess sodium nitrite was decomposed by addition of 0.2 g. of urea. The resulting solution was filtered from a small amount of impurity and used immediately.

*Coupling (B)*

To an iced solution of 0.95 g. (0.005 mole) of 4-methyl-6,7-benzo-1-thia-5-aza-4,6-cycloheptadiene-2 - one is a mixture of 1 ml. of concentrated sulfuric acid and 10 ml. of water was added one half of the p-nitrobenzenediazonium solution from (A) (0.005 mole). The coupling mixture was neutralized to Congo red paper with a saturated solution of sodium acetate. After standing for 1 hour, the dye was filtered, washed with water, and dried. The dye weighed 1.62 g. (yield=95.5%). It dyed polyester fabrics a bright yellow shade with good fastness properties.

Other diazotized amines are used for preparing useful dyes as shown in the following table:

| Coupling Component | Diazonium | Color of Dye on poly-(1,4-cyclohexylenedimethylene terephthalate)-Fastness to Light |
|---|---|---|
| 4-Methyl-6,7-benzo-1-thia-5-aza-4,6-cycloheptadiene-2-one. | 2-Chloro-4-nitro-aniline. | Deep greenish-yellow, Light fastness—fair. |
| | 4-Methoxy-2-nitro-aniline. | Orange-yellow, Light fastness—good. |
| | 2-Amino-5-nitro-phenyl methyl sulfone. | Deep lemon-yellow, Light fastness—good. |
| | 2,4-Bismethyl-sulfonyl aniline. | Lemon-yellow, Light fastness—good. |
| | 2-Amino-5-nitro-thiazole. | Light russet, Light fastness—fair. |
| | 4-Chloro-2-nitro-aniline. | Deep-bright yellow, Light fastness—excellent. |
| | p-Nitroaniline. | Deep-bright yellow, Light fastness—fair. |
| | 2,4-Dinitro-aniline. | Light russet, Light fastness—good. |
| | 5-Amino-4-nitro-2-thienyl isopropyl ketone. | Russet, Light fastness—good. |
| 4-Phenyl-6,7-benzo-1-thia-5-aza-4,6-cycloheptadiene-2-one. | 2,4-dinitroaniline. | Deep yellow, Light fastness—good. |
| | 4-Methoxy-2-nitro-aniline. | Deep orange-yellow, Light fastness—fair. |
| | 2,4-Bismethyl-sulfonylanaline. | Lemon yellow, Light fastness—fair. |

What we claim is:

1. Monoazo compounds having the general formula

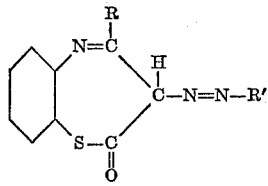

wherein R=a member of the class consisting of lower alkyl and a benzene radical, $R_1$=a member of the class consisting of a benzene radical and the radicals

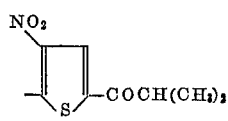

and

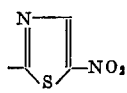

2. Monoazo compounds having the general formula

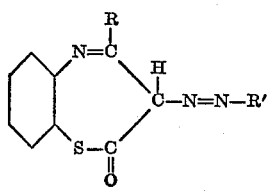

wherein
R=lower alkyl
R'=a benzene radical

3. Monoazo compounds having the general formula

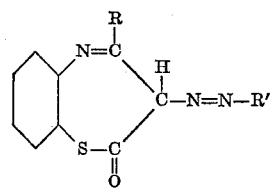

wherein R and R' each represent benzene radicals.

4. The azo dye of formula

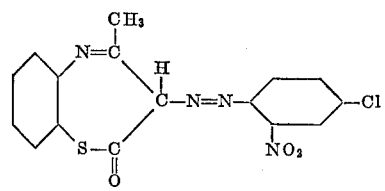

5. The azo dye of formula

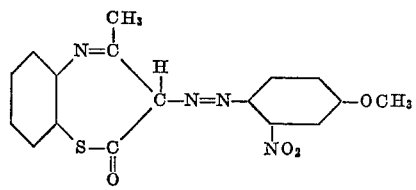

6. The azo dye of formula

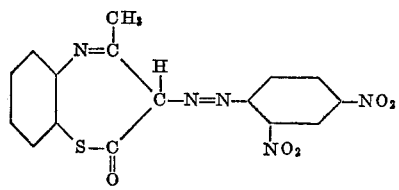

7. The azo dye of the formula

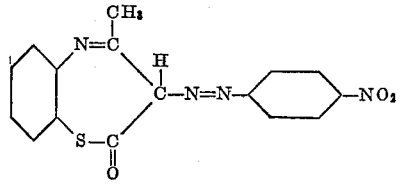

8. The azo dye of formula

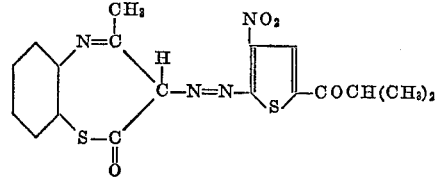

9. The azo dye of formula

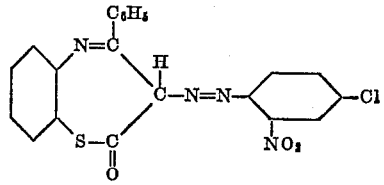

No references cited.